Nov. 9, 1954  W. C. GOSS  2,693,619
METHOD OF AND APPARATUS FOR THE FORMING
OF FIBER PADS FOR BOARD MAKING
Filed May 29, 1950  3 Sheets-Sheet 1
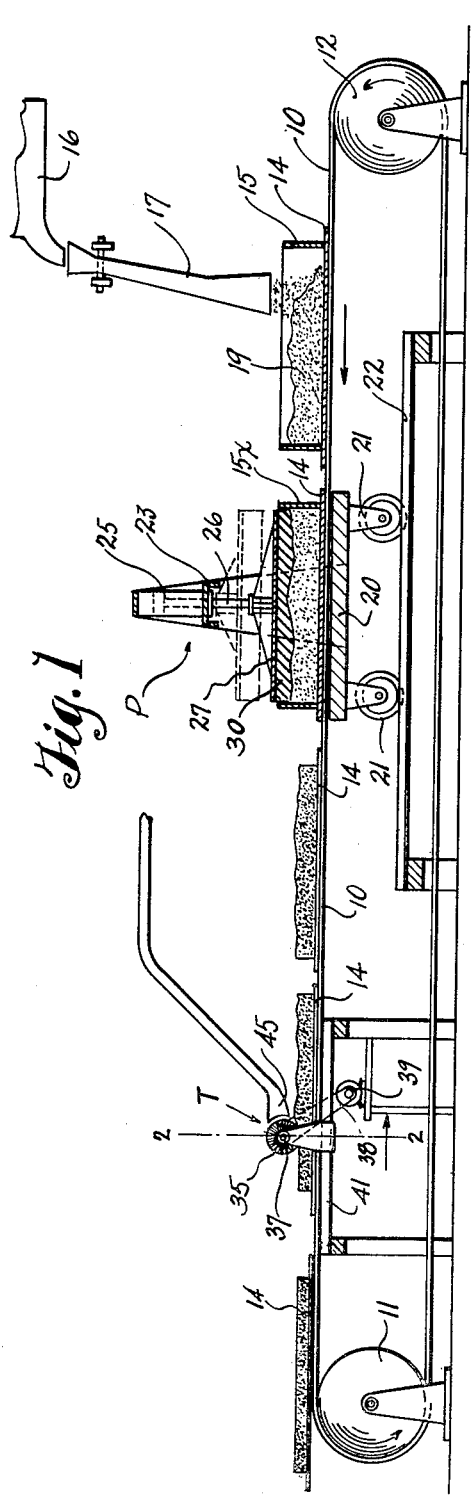
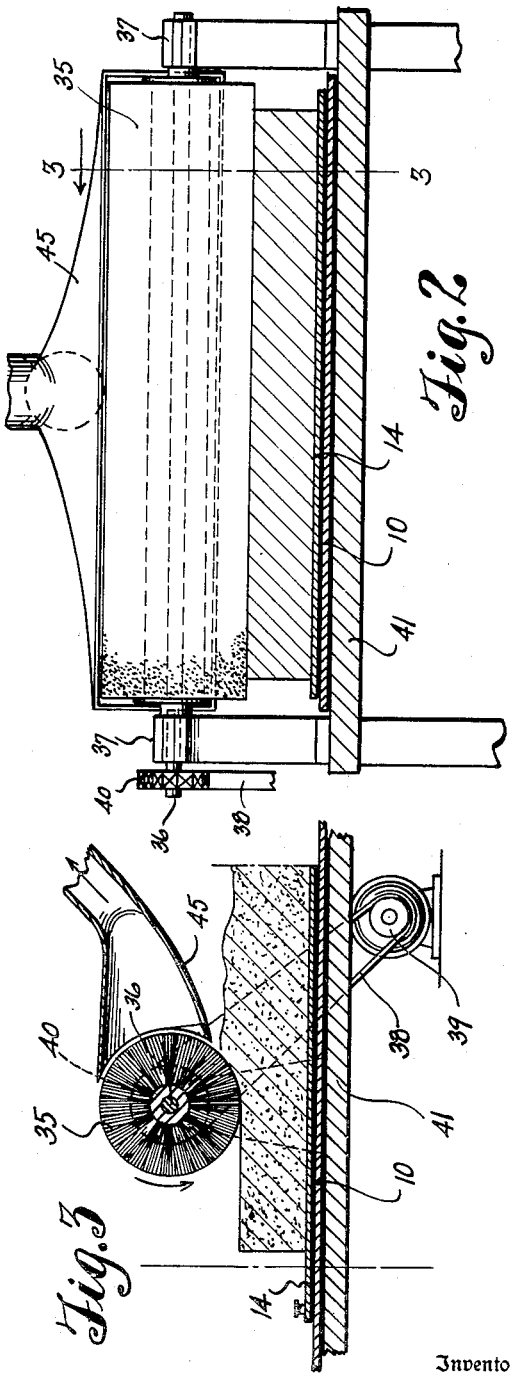
Inventor
WORTH C. GOSS
By Cook & Robinson
Attorney Nov. 9, 1954
W. C. GOSS
2,693,619
METHOD OF AND APPARATUS FOR THE FORMING
OF FIBER PADS FOR BOARD MAKING
Filed May 29, 1950
3 Sheets-Sheet 2
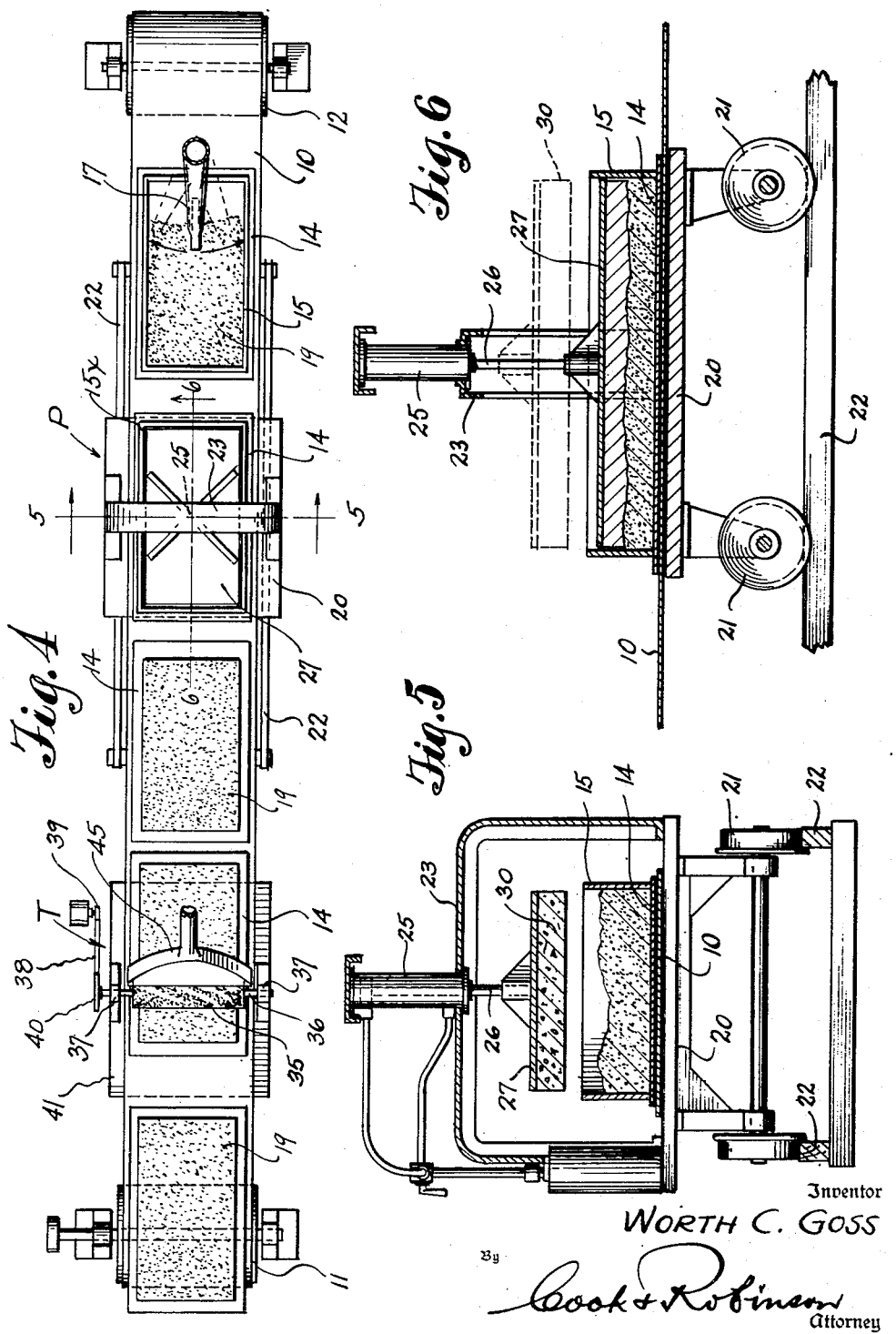
Inventor
WORTH C. GOSS
By
Cook + Robinson
Attorney Nov. 9, 1954  W. C. GOSS  2,693,619
METHOD OF AND APPARATUS FOR THE FORMING
OF FIBER PADS FOR BOARD MAKING
Filed May 29, 1950  3 Sheets-Sheet 3
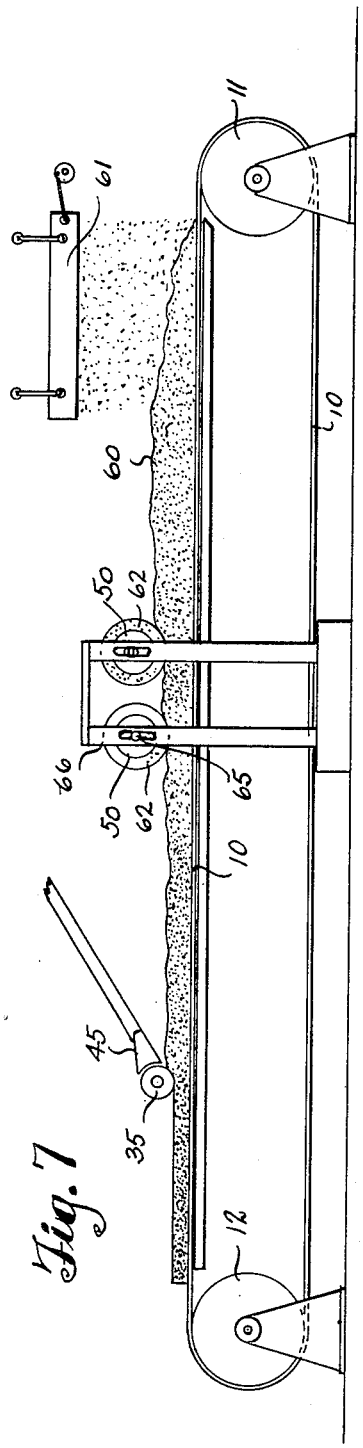
Inventor
WORTH C. GOSS
By
Cook & Robinson
Attorney United States Patent Office 2,693,619
Patented Nov. 9, 1954

2,693,619

**METHOD OF AND APPARATUS FOR THE FORM-
ING OF FIBER PADS FOR BOARD MAKING**

Worth C. Goss, Seattle, Wash., assignor to The Sheet-
wood Products Company, Seattle, Wash., a corporation
of Washington Application May 29, 1950, Serial No. 164,885

9 Claims. (Cl. 19—155)

This invention relates to the manufacture of products from such materials as ligno-cellulosic fibers, sawdust, glass-wool, and other fibrous or comminuted materials of a compressable character, and which manufacture involves the laying down of the fibrous or otherwise reduced material to form a body, blanket or pad which is later compressed and unified to form a rigid, non-expandable sheet or board. More particularly the present invention relates to a method of and apparatus for the pre-pressing of the bodies of material as initially formed, and for adjusting them to a definite and uniform thickness and density preparatory to their being subjected to final compression, or treatment for their permanent unification as boards or sheets of a predetermined density and thickness.

While the present method, and the apparatus designed for carrying out the method, are applicable to various materials, which may be ground, chopped or fiberized, the present invention is concerned primarily at present with the manufacture of sheetwood made from fiberized wood. Therefore, in the following specification, I will refer to the material employed in the manufacture, as fibers, with the understanding however that the word "fibers" is intended to include all materials that may be chopped, ground, or otherwise reduced, or to materials that might, in their natural state, be of the character of fibers or finely reduced materials that could be employed in a like manner for a like or analogous purpose.

In the making of sheet lumber products by the condensing and unification of pads of wood fibers under the action of heat and pressure as has been described in my U. S. Patent #2,485,587, and also in my co-pending application, filed under Serial Number 3,000, now Patent No. 2,581,652, dated January 8, 1952, it has been an extremely difficult matter to produce pads in succession which were all of the same and of a predetermined density. This has been especially true of those pads formed by sifting the fibers through a screen and allowing them to fall onto a moving belt, or into a frame, or form, or by discharging them from a swinging spout onto a belt or into a form.

Unevenness of fiber distribution in preparing a pad, that is subsequently compressed and unified by pressure or by a joint application of heat and pressure, is visibly apparent in the finished board in an unevenness of color, usually a mottled surface effect. It is also manifest in variations in density in different parts of the same board or between different boards. A high area on the original body of material will in the final compressing operation, be subjected to greater pressure than lower areas and will generally appear darker on the surface of the finished board. Also, since a higher area will be subjected to greater pressure, it will be of higher density in the finished product. Low areas in the original body, likewise, appear lighter in color in the finished board and result in areas of lower density.

In view of the above, it has been the principal object of this invention to provide a method that is practical and economical, and a simple and effective means or apparatus for practising the method for the laying down of a body of fibers, or for the formation of pads, of uniform and predetermined thickness and density, thus to make possible the formation therefrom of boards having uniformity of color as well as uniformity of density throughout. Furthermore, to provide means for this purpose that is well adapted for use in the manufacture of sheet lumber of the character of that described in my patent and co-pending applications above mentioned as well as for other analogous operations.

In carrying out my method, and in accomplishing the various objects of the present invention, I have provided apparatus, the preferred forms of which are illustrated in the accompanying drawings, wherein—

Fig. 1 is a side view of a pad forming mechanism, including a fiber lay down means, a pre-pressing device for the fiber body, and a pad trimming mechanism, embodied by the present invention, parts thereof being in section for better understanding.

Fig. 2 is a somewhat enlarged, vertical cross-section, taken on the line 2—2 in Fig. 1.

Fig. 3 is a section taken on line 3—3 in Fig. 2.

Fig. 4 is a plan view of the parts shown in Fig. 1.

Fig. 5 is an enlarged, cross-sectional view taken on the line 5—5 in Fig. 4.

Fig. 6 is an enlarged vertical section taken on line 6—6 in Fig. 4.

Fig. 7 is a side view of an apparatus employing a pre-pressing roller.

The present invention pertains to a method of and means for the preparation of pads from fibers that may be either dry or damp and which fibers can be laid down to form a fiber body, that is, they may be sifted through screens or discharged from a spout to build up a fiber body on a moving belt, or in a frame or form of definite size, or as a continuous strip, as differentiated from the making of pads or blankets of fibers according to those processes which are generally known as "wet lap" felting.

Referring more in detail to the drawings—

The fiber pre-pressing and trimming or adjusting mechanism of the present invention is shown in Figs. 1 and 4, as being designed for use in connection with a system and apparatus now being used for laying down damp wood fibers to form pads of predetermined size which, under the action of heat and pressure, applied by means not herein shown, are made into rigid panels of sheet lumber. The apparatus of Fig. 7 is designed for use with apparatus that forms a continuous fiber body on a traveling belt. The apparatus of Fig. 1 will first be described.

In the present system, means of various kinds have been used to lay down the fibers to form the fiber bodies from which the pads are made. For example, in one operation, the wood fibers were sifted through a screen and allowed to fall into a frame or form that defined the width and length of the pad. In another system of operation, fibers were discharged from a source of supply through a suspended spout that was caused to swing back and forth across a frame or form as it was progressively advanced, thus to build up the fiber body. In each of these systems, there has been a noticeable lack of uniformity, both of thickness and density as between successive pads, as well as lack of uniformity of thickness over the area of the individual pads. When pads are made from fiber bodies built up by methods as above stated, it is usual that the bodies build up to greater depth adjacent the walls of the frames or forms that define the dimensions thereof. Where unevenness has been readily apparent, attendants have leveled off the top surface with brushes or rakes. This, however, has not proved to be successful for even though the individual bodies might be leveled off in satisfactory manner, there still could be a lack of uniformity in thickness as between different or successive bodies. The present apparatus has been designed with the object in view of not only forming pads of exactly the same thickness, but also of insuring that all finished pads will be of the same density as well as of a predetermined thickness, thus to insure that boards can be made therefrom that will have identical characteristics, particularly as pertaining to density, thickness and color.

Figs. 1 to 6 of the present drawings, illustrate the use of mechanisms as used in connection with other apparatus employed in an operation conducted on a production line basis. However, it is to be understood that the use of the present pad forming mechanism is not to be confined to this particular relationship to associated apparatus, but is only illustrative of my method, and a satisfactory mechanism for its accomplishment.

In Fig. 1, 10 designates a continuous, horizontally extending belt of substantial width, that is operable about wheels or drums 11 and 12 at opposite ends of the belt; one or both of which wheels might be driven by suitable means, not herein shown, to cause the belt to be progressively advanced in the direction indicated. The top run of the belt is supported, as may be required, by suitable means, and it is designed to convey in succession thereon, the caul plates 14, on each of which a rectangular frame or form 15 with vertical walls is placed to receive the wood fibers for the formation of a pad therein, which pad is ultimately to be compressed and unified to form a sheet of lumber.

Fibers are delivered from a source of supply designated at 16 and by means not here shown, into a spout 17 which is swingingly suspended and is caused by means not shown, to oscillate transversely of the direction of travel of the belt to build up a body of fibers in the frame. In Fig. 1 such a body of fibers, in the process of formation is designated at 19.

For a better understanding of the need and desirability for the present pre-pressing and pad adjusting or trimming means, I have designated at 15x, a frame or form in which fibers have been laid down to a depth somewhat more than is required for a completed pad. The top surface of the body of fibers is shown to be irregularly formed. That is, it is of uneven depth over its area. If this body of damp wood fibers should, without being leveled off, be formed into a board under the action of heat and platen pressure, it would not be uniform either in density or color. It is to avoid the undesirable results of such irregularity of depth of body that the present pad trimming or adjusting means is provided. This will now be described.

At a location advanced along the belt from the location of the spout 17 and place of charging frame 15, is a press, designated in its entirety by reference character P. This press is herein designated as the pre-press, and it is designed to be used to somewhat compact the fibers of the bodies 19 preparatory to their being adjusted or reduced to a definite and uniform thickness. Still farther advanced along the belt is the trimming or pad adjusting unit, designated in its entirety in Fig. 1 by reference character T, whereby the bodies, after being subjected to a predetermined compacting pressure by press P, are trimmed down to the designated thickness.

It is to be understood that the present pad adjusting operation is not to be confused with a leveling off operation that would be effected by a brushing off of high spots and filling in of low spots, but is an operation wherein the body is cut down in depth to a predetermined level that is below the lowest point of the top surface of the pre-pressed body.

The press P is here shown to be of a type designed to travel with the belt 10 as it advances, however, it is not necessary that it be of the traveling type, provided that the belt be stopped in its travel during the pressing operation. Also, as here illustrated, the press comprises a horizontal base 20, supported by wheels 21 for travel on a track 22 extending beneath and along the belt. The upper run of the conveyor belt 10 lies flatly upon and extends across the top of the base 20 and may slide thereon. An arch, or yoke 23, is fixed to the base to extend over and across the belt with substantial clearance. Rigidly supported by the arch, as best shown in Fig. 5, is an air jack comprising a vertical cylinder 25 from which a piston rod 26 extends downwardly. At its lower end, the rod supports a horizontal press plate 27 with dimensions corresponding substantially to those of the frame, or form 15 and adapting it to enter the latter from the top for the compacting or pre-pressing of the fiber pad 19. The admittance of a fluid pressure medium to the jack cylinder may be accomplished in the usual way, to move the press plate downwardly to apply the necessary compacting pressure against the body, and to lift the press plate out of the form after the body has been compressed to the required extent to prepare it for adjustment by the trimmer.

Explanatory to this operation, it will be understood that it is desirable and necessary to give the loose fiber body sufficient density that its top portion can be trimmed down to a definite level by means of a revolving brush or the like, but not to so compress it that different areas, exemplified by the high and low spots on the pad, shall be of any material difference in density. Therefore, I have equipped the under side of the press plate 27 with a resilient cushion. In Fig. 1, this cushion is shown to be a thick, sponge rubber pad 30 that has a resistance to compression, that is comparable to the resistance of the fiber pad to compression. In lieu of a sponge rubber pad, I may use an air mattress, or a hydraulic mattress, each of which would be so designed that pressure applied therethrough would be uniformly distributed over the entire area of the pad being compressed.

In the present operation, the sponge rubber pad 30 is about eight inches thick. The fiber bodies that are pressed thereby, are four feet wide, eight feet long and may have an original thickness of from 10 to 24 inches, depending upon the thickness of board that is to be made therefrom. As the rectangular forms 15 are successively advanced by the belt, they first receive fibers from spout 17 to form the fiber bodies 19. Subsequently, the fiber bodies, as prepared in the forms 15, are successively brought to position directly overlying the base 20 of the press whereupon the press plate 27 is actuated downwardly into the form, against the fiber body to reduce it to a substantially compact pad under a pressure of about eight pounds per square inch. In this operation, any lack of uniformity in depth of body 19, by reason of irregularity of its top surface, is compensated for in the easy compressability of the rubber pad 30, with the result that, although the fiber body is somewhat compressed or compacted over its entire area to the extent required to make possible the satisfactory use of the trimming brush, there will be no appreciable difference in density in difference parts of the pad by reason of high or low spots in the original fiber bed.

The same compressing result would be effected by use of an air cushion or a hydraulic cushion if such were used in lieu of the sponge rubber pad. Where extreme uniformity is necessary, the air mattress would be used.

After this compacting of the fiber body by the press P, the forms 15 are removed from about the same. This may be accomplished by disconnecting the side and end wall members thereof. The pre-pressed body remains however on the belt for advancement to the trimming unit.

The pad adjusting or trimming unit T comprises a cylindrical, revolving bristle brush 35 supported transversely of and above that section of the belt on which the pads are conveyed, by an axle or shaft 36. This brush mounting shaft is supported revolubly at its ends in stationary bearings 37—37 and is driven by a suitable belt 38 operating over a motor driven wheel 39 and a belt wheel 40 fixed on the shaft 36. The bearings are supported from a flat base structure 41 across which the belt travels and is thereby held at an exact distance of spacing from the brush.

Assuming the apparatus as above described to be so constructed and assembled, the present method of forming the pads thereby, is as follows:

The belt 10 is caused to be advanced at a predetermined rate of travel and the caul plates 14 and frames 15 are assembled thereon for travel, in succession, beneath the swinging spout 17 from which the fibers are discharged to build up the fiber body 19 thereon to a designated depth.

When the fiber body containing frame or form 15 reaches a certain position in its advancement by the belt, the traveling press P is brought into position thereover with press plate 27 raised to the dotted line position shown in Fig. 1, then the fiber body is subjected to compacting pressure by the press plate. To accomplish this, a fluid pressure medium is applied to the upper end of cylinder 25, to move the press plate downwardly and engage the rubber pad 30 with the fiber body 19. A predetermined compacting pressure is maintained for a predetermined time interval to insure a uniform pre-pressing of all pads. This is of importance.

Under force of the air jack, the fiber body is somewhat compacted, or partially consolidated, as has been indicated in Fig. 6. However, in this pre-pressing operation, and because of the easy yieldability of the pad 30, the top surface of the fiber body is not caused to be flattened down and thus be given the undesirable, non-uniformity of density by reason of unevenness in its original thickness, but to the contrary, the loosely laid fibers are merely compacted under a pressure that is substantially uniform over the entire area of the body and therefore the body in pre-pressed condition will be substantially of uniform density over its entire area.

It is to be understood also that the body should be originally formed to such depth that after being pre-pressed the lowest spot in its top surface will not be below the level to which the bodies are trimmed by the brush. It is not desired that there shall be any low spots to be filled in by the brush.

After the body 19 has thus been partially compressed, the frame 15 is removed and the compacted body advanced beneath the revolving brush 35. This brush, being of a bristle type, operates to sweep away the top surface of the body down to the designated predetermined level, leaving the top surface of the finished pad level, and the pad of an exact uniform thickness over its entire area. Fibers that are removed by the brush may be returned through suction hood 45 to the fiber supply if so desired.

In the event that an air mattress is used in lieu of the sponge pad 30, there probably will be greater uniformity of pressure, as the air flow to all parts of the mattress would be easier than afforded by the sponge rubber. The hydraulic mattress may be more desirable under certain conditions.

It is further to be explained that, alternatively, the fiber bodies, after being compacted by the press, might be held stationary and the brush caused to pass thereover. Furthermore, the fiber bodies might be laid down by sifting the fibrous material and allowing it to fall onto the belt, or it might be blown from a spout into the form.

In lieu of a brush for taking off the top surface portion of the compressed bodies, a cutter of band saw character might be applied.

In Fig. 7 I have illustrated the use of an alternative pad pre-pressing means in the form of one or more large resilient rollers 50 so arranged transversely of the belt to roll on the prepared bed of fibers as they are advanced. This type of pre-press may be more desirable than the other types especially for a continuous fiber lay down operation.

In the system disclosed in Fig. 7, a body of fibers 60 is laid down on the continuously moving belt 10 by permitting the fibers to fall through a reciprocating screen 61 onto the belt as it is advanced. The body, or strip of fibers, 60, is formed to a predetermined depth and is then compressed by the rollers 50 as it is caused to pass thereunder. Each roller 50 is of relatively large diameter and is equipped with a thick cylindrical tire of sponge rubber 62. The roller is mounted by an axle 65 that is contained at its ends in vertical guides 66, to permit it to rise and fall as may be required. A uniform pressure is thus applied to the body of fibers and it is compressed for the same purpose and to substantially the same extent as effected by the pad 30 of the device of Fig. 1.

The adjusting of the pre-compressed body of fibers is then accomplished in the same manner as in the system of Fig. 1 by causing the body to pass beneath the revolving brush 35.

The essence of the present invention resides in the steps of promiscuously laying down the fibers to form a loose fiber body; the pre-pressing of the bodies to give them a uniform and substantial amount of compactness; the trimming off or brushing off of the top surfaces of the compressed bodies to give all pads the desired predetermined and uniform thickness. This invention goes beyond the mere leveling off of a fiber body, or the leveling off of a fiber body without a previous pre-pressing operation that gives all pads a uniform and predetermined density that is necessary in order that successive pads of the same density and thicknesses can be made in hot presses where limiting stops are used to establish the final spacing of the press platens.

Pre-pressing should be carried on at relatively low pressures and by means having extreme sensitivity in so far as distribution of compression forces over the surface of the body is concerned. Furthermore, pre-pressing pressure should be maintained for a time interval on each body sufficient to allow air that is trapped in the body to be dissipated and its expanding effect thereon reduced to ineffectiveness. Also, sufficient fiber should be initially laid down that after pre-pressing the body, there will be no part of its top surface at a lower level then the level of operation of the brush.

By reason of the fact that the fibers can be laid down on the base plates in various ways, such as by sifting, blowing, by hand or in other ways, the term "sifting" is used in the claims to designate the fiber lay-down operation regardless of how it is done so long as not inconsistent with the invention.

Likewise, since it is anticipated that the pre-pressing of the fiber body can be accomplished by press cushions or mattresses of various kinds, exemplified by the sponge rubber pad 30 of Fig. 1, or by the resilient roller 50 of Fig. 7, or by air or hydraulic mattresses; the term which may be used in the appended claims to designate the pre-pressing element should be considered to be any one of the devices disclosed or anything equivalent thereto and usable in a way not inconsistent with the invention disclosed.

Having thus described my invention, what I claim as new therein and desire to secure by Letters Patent, is:

1. In the manufacture of compressed fiber products, the method of preparing fiber pads for compression and unification comprising depositing a fibrous material onto a flat base to form a loosely matted body having a varying density and a top surface formation which includes a plurality of irregularly disposed depressions and projections, applying pressure uniformly to the top surface of the body with a resilient and self-conforming medium which enters into the depressions and engages the projections to pre-press the body of material to a uniform density, then trimming away the top surface portion of the compacted body of material to leave a flat surfaced pad of uniform density and thickness throughout.

2. In the manufacture of compressed fiber products of the character described, the method of preparing fiber pads for compression and unification comprising depositing a fibrous material onto a flat base to form a loosely matted body of fibers, said body having a top surface of irregularly disposed depressions and projections, applying compacting pressure uniformly to the top surface of the body with a resilient and self-conforming medium which enters into the depressions and engages the projections and maintaining the application of said compacting pressure until the pad expanding pressure of entrapped air has become negligible, then trimming away the top surface portion of the compacted body of material to a depth that will leave a flat surfaced pad of uniform thickness and density throughout.

3. The method of manufacturing compressed fiber products in sheet form, comprising promiscuously depositing the fibrous material onto a flat base to form a loosely matted body of fibers of substantial depth said body having a top surface of irregularly disposed depressions and projections, applying compacting pressure uniformly to the top surface of the body with a resilient and self-conforming medium which enters into the depressions and engages the projections, and maintaining this pressure until the pad expanding pressure of entrapped air becomes negligible, trimming away the top surface portion of the compacted body of material to a depth that will leave the pad with a flat top surface, and with uniform thickness and density throughout.

4. In the manufacture of compressed fiber products; the method of preparing fiber pads for compression and unification comprising depositing a fibrous material onto a flat, horizontally moving base to form a loosely matted body of said material thereon said body having a top surface of irregularly disposed depressions and projections, applying compacting pressure uniformly to the top surface of the body with a resilient and self-conforming medium which enters into the depressions and engages the projections, causing the body of compacted material to be moved beneath a revolving brush and its top surface portion removed to a depth that is below the lowest depression of the top surface of the compacted body, thus to provide a pad of uniform thickness and density throughout.

5. The method of maufacturing compressed fiber products in sheet form, comprising depositing a fibrous material promiscuously onto a horizontally traveling flat base, to form a body of loosely matted fibers of substantial depth thereon said body having a top surface of irregularly disposed depressions and projections, advancing the body of material to a pre-press and then applying compacting pressure uniformly to the top surface of the body with a resilient and self-conforming medium which enters into the depressions and engages the projections whereby the body of material is given uniform density at all points regardless of variations in its thickness, causing the compacted pad to advance beneath a revolving brush, which is caused to operate to progressively remove the top surface portion of the pre-pressed body to a depth below the lowest depression in its top surface.

6. The method recited in claim 5 in which the pre-pressing pressure on the body of material is maintained for a time interval sufficient to cause the pad expanding pressure of entrapped air to be ineffective when the pre-pressing pressure is removed.

7. The method of producing compressed fiber boards, or the like, of like thickness and density, comprising depositing fibrous material promiscuously onto a horizontally traveling, flat base to form a loosely matted body of said material of substantial depth thereon said body having a top surface of irregularly disposed depressions and projections, causing successive sections of said body of material to be advanced beneath a pre-pressing means and then applying compacting pressure uniformly to the top surface of the body with a resilient and self-conforming medium which enters into the depressions and engages the projections whereby each section is brought to a predetermined and uniform density throughout, advancing the pre-pressed sections of the body in succession beneath means that removes the top portions thereof to a level that establishes a pre-determined and uniform depth for all sections.

8. Apparatus for the making of fiber pads comprising a horizontally traveling belt, means for depositing fibrous material onto the belt to form a body of said material thereon, a pre-press having a base across which the belt is passed, and a resilient, conformable press platen, operable against the body and toward the base to compact the body therebetween to a uniform density, a brush supported above the belt and beneath which the pre-pressed body is caused to be advanced for removal of its top surface portion to reduce the body to an exact and uniform thickness.

9. Apparatus of the character described comprising a continuous, horizontally traveling belt and a supporting base below the belt, means for depositing a fibrous material onto the belt to form a body of said material of substantial depth thereon, a resilient conformable pressing element operable against the body and toward the base to compact the body therebetween to uniform density throughout, and a revolving brush disposed to act against the pre-pressed body as it is advanced by the belt to brush away the top portion thereof to give the body an exact and uniform thickness.

References Cited in the file of this patent

UNITED STATES PATENTS

| Number | Name | Date |
|---|---|---|
| 561,689 | Patterson | June 9, 1896 |
| 1,336,402 | Weiss | Apr. 6, 1920 |
| 1,986,404 | Madge et al. | Jan. 1, 1935 |
| 2,130,944 | Bowen | Sept. 20, 1938 |
| 2,193,263 | Avery | Mar. 12, 1940 |
| 2,230,880 | Brown | Feb. 4, 1941 |
| 2,441,169 | Roman | May 11, 1948 |
| 2,544,019 | Heritage | Mar. 6, 1951 |